United States Patent Office 2,768,209
Patented Oct. 23, 1956

2,768,209

REDUCTION OF 2-NITRO 1-PHENYL PROPENE-1

Lester P. Kuhn, Oxford, England, assignor to Ringwood Chemical Corporation, Ringwood, Ill., a corporation of Illinois No Drawing. Application January 30, 1951,
Serial No. 208,655

1 Claim. (Cl. 260—580)

My invention relates to the reduction of organic compounds. More particularly, my invention relates to the catalytic reduction of organic compounds. Specifically, my invention relates to the catalytic reduction of organic compounds employing hydrazine as the reducing agent.

The importance of reduction methods in organic synthesis is well known to those skilled in the art. Among the extremely large number of reduction reactions known may be mentioned the stepwise conversion of acetylenes to olefines and finally to paraffins, the selective reduction of enynes to polyenes and of polyenes to olefines, reduction of acids, esters, acid chlorides, acid anhydrides, lactones and epoxides to alcohols, of ketones to alcohols and, finally, to hydrocarbons, of quinones to quinols, of amides and nitriles to amines and the stepwise reduction of aromatic nitro compounds to azoxy, azo, hydrazo and amino compounds.

A large number of reducing agents and reduction methods have been suggested in the prior art. In many instances, an organic reactant may contain two or more groups, each capable of reduction, and in many other instances an organic reactant may carry one or more groups exhibiting two or more stages of reduction. (Examples of both types of reactants are to be found in the preceding paragraph.) Very frequently, reducing agents and/or reduction methods are sought which will reduce only one of two or more reducible groups present or which will reduce a reducible group to an intermediate reduction stage. As examples of the first type of agents and methods may be mentioned the use of partially poisoned palladium catalysts in the partial hydrogenation of conjugated enynes to polyenes, the use of lithium aluminum hydride to reduce unsaturated carbonyl compounds to olefine alcohols, to reduce cyclohexane 1,2-dione to 2-hydroxy cyclohexane 1-one and the like and the use of sodium borohydride to reduce m-nitro benzaldehyde to m-nitro benzyl alcohol, and the like. As examples of the second type of agents and methods may be mentioned the conversion of acetylenes to olefines by sodium in liquid ammonia, reduction of nitrobenzene to azoxybenzene through use of sodium methylate, conversion of azoxybenzene into azobenzene by heating with finely divided iron and finally the converson of azobenzene to hydrazobenzene by reduction with zinc dust in aqueous alkaline solution, etcetera.

I have discovered a new and improved method for the reduction of organic compounds. By the use of my new and improved method, not only is it possible to reduce certain organic compounds with ease but also, in many instances, it is possible to reduce selectively but one of two or more reducible groups present in the organic reactant. Through use of my new and improved method it is possible to reduce certain organic compounds in a more facile manner than has hitherto been possible and, in addition, in many instances it is possible to reduce selectively less than all of the potentially reducible groups in organic reactants whereby reduction products are obtained which have hitherto been difficult or impossible to prepare.

One object of my invention is to provide a new and improved process for the reduction of organic compounds.

Another object of my invention is to provide a new and improved process for the selective reduction of less than all of the potentially reducible groups in organic compounds.

An additional object of my invention is to provide a new and improved reducing agent for the reduction of organic compounds.

Further objects of my invention will become apparent as the description thereof proceeds.

Broadly and briefly, my new and improved process embraces the reduction of organic compounds by means of a new and improved reducing agent comprising hydrazine (including derivatives of hydrazine) and catalytic amounts of metallic palladium, metallic platinum or, less advantageously, metallic nickel.

It has long been known that hydrazine is an extremely powerful reducing agent, reacting rapidly and quantitatively with, for example, a wide variety of inorganic oxidizing agents. However, hydrazine is generally a comparatively ineffective reducing agent with respect to most reducible organic compounds. Some very rapidly reducible organic compounds, such as certain quinones, tetranitromethane and the like, are reduced by hydrazine at room temperature but most reducible organic compounds are either not reduced by hydrazine or require an elevated temperature for such reactions to proceed. For example, substituted nitrobenzenes, which are by no means to be considered difficultly reducible compounds, require temperatures in the range 80–140° C. for reduction by hydrazine.

I have discovered that in the presence of the previously mentioned catalysts, hydrazine exerts a powerful reducing action even at room temperature towards certain reducible organic compounds. Furthermore, the reducing action of hydrazine in the presence of the above mentioned catalysts is frequently highly selective, thereby making possible the reduction of but one of a plurality of potentially reducible groups present in the reacting molecule. In addition, some variation in selectivity may be achieved by proper choice of the catalyst employed.

For the better understanding of my invention, reference may be had to the illustrative and non-limiting examples thereof that follow. As is well known to those skilled in the art, hydrazine, while potentially a comparatively cheap chemical, actually is quite expensive due to the lack of large scale demand and other causes. Accordingly, it is evident that my process is presently most advantageously applied to the reduction of fine organic chemicals, for example, pharmaceutical intermediates and pharmaceuticals, and to the preparation of compounds difficult or impossoble to produce by conventional procedures. In spite of this, many of the following examples describe the application of the process of my invention to the reduction of simple organic compounds which can be reduced as expeditiously and much more cheaply by conventional methods. However, such simple examples illustrate the principles of my improved process more clearly than examples detailing the same reduction reaction involving a highly complex molecule.

*Example 1*

The catalyzed hydrazine reduction of hexyl nitrate was conducted in a reaction vessel provided with a dropping funnel, a side arm for conducting evolved gases to a collecting vessel and a gas tight stirrer.

A solution of two parts by weight hexyl nitrate dissolved in 40 parts by weight methanol together with one part by weight 5% palladium on charcoal catalyst (American Platinum Works) were added to the reaction vessel. The resulting mixture was stirred and a solution of hydrazine (prepared by diluting hydrazine hydrate with methanol) was slowly added at room temperature to the mixture through the dropping funnel. Each addition of hydrazine resulted in the immediate evolution of gas until an equimolecular quantity of hydrazine (based on hexyl nitrate) had been added. Hydrazine in excess of this amount resulted in no additional production of gas.

The catalyst was removed from the reaction mixture by filtration and the filtrate, which was free from nitrates, was distilled. After the removal of methanol and water, hexanol was obtained in better than 90% yield. B. P., 157° C.

Gas in the collection vessel amounted to 1.5 moles per mole of hydrazine (or hexyl nitrate) reacting and contained 33% nitrous oxide. It is believed that the reaction follows the course indicated by the equation:

$$2C_6H_{13}ONO_2 + 2N_2H_4 = 2C_6H_{13}OH + N_2O + 2N_2 + 3H_2O$$

In this experiment the catalyst:nitrate ratio was high but this was dictated by convenience rather than necessity. In other experiments, 20 parts by weight of nitrate were used (together with an equimolecular quantity of hydrazine) but the quantity of catalyst was held constant at one part. Very satisfactory results were obtained.

*Example 2*

Hexyl nitrite was reduced in a manner similar to that described in connection with the reduction of hexyl nitrate in Example 1. Gas evolution ceased after addition of but half a mole of hydrazine per mole of hexyl nitrite. Hexyl alcohol was recovered from the reaction mixture in almost quantitative yield.

During reduction of hexyl nitrite the gas evolved amounted to one mole per mole of nitrite (two moles per mole of hydrazine) and contained 50% nitrous oxide. It is believed that the reaction proceeds as follows:

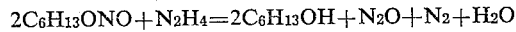
$$2C_6H_{13}ONO + N_2H_4 = 2C_6H_{13}OH + N_2O + N_2 + H_2O$$

*Example 3*

At room temperature nitrobenzene is not affected by hydrazine alone but was readily reduced at room temperature by the catalytic procedure described in connection with Example 1. With nitrobenzene, reaction ceased after the introduction of 1.5 moles hydrazine per mole of nitrobenzene. After completion of the reaction, the catalyst was removed by filtration and the filtrate was distilled to remove methanol and water. The distillation residue was taken up in ether, water washed and then dried over anhydrous sodium sulfate. Hydrogen chloride was passed into the dried ether solution and a quantitative yield of aniline hydrochloride was obtained. M. P., 196° C.

The gas produced (1.5 moles per mole of nitrobenzene; 1.0 mole per mole of hydrazine) was pure nitrogen. It is believed that the reaction follows the path:

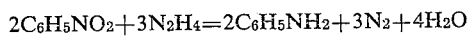
$$2C_6H_5NO_2 + 3N_2H_4 = 2C_6H_5NH_2 + 3N_2 + 4H_2O$$

*Example 4* m-Chloronitrobenzene was reduced as previously described, using 1.5 moles hydrazine per mole of the organic compound. A quantitative yield of m-chloroaniline was obtained, isolated as the hydrochloride. It is to be noted that in this reduction reaction hydrogenolysis of the chlorine substituent did not occur, a reaction generally observed with some reducing agents e. g. lithium aluminum hydride.

*Example 5* m-Dinitrobenzene was reduced as previously described, taking care that but 1.5 moles of hydrazine were employed per mole of the dinitrobenzene. A 75% yield of m-nitroaniline was obtained, the product being recovered as the hydrochloride as described in connection with Example 3.

By using three (or more) moles of hydrazine per mole of m-dinitrobenzene, complete reduction occurs with the formation of m-phenylenediamine.

*Example 6*

Symmetrical trinitrobenzene was reduced at room temperature with hydrazine in the presence of a catalyst consisting of 5% palladium on alumina. The mole ratio of the two reactants was 1:1.55, respectively. The principal reaction product was 5-nitro 1,3-diaminobenzene which, after recrystallizing from water to a melting point of 139–140° C., was recovered in 26% yield, based on trinitrobenzene, or a yield of 52% based upon the amount of hydrazine used.

*Example 7* p-Nitrobenzoic acid was reduced at room temperature with a small excess of hydrazine in the presence of a catalyst consisting of 5% palladium on alumina. A 25% yield of crude p-aminobenzoic acid was obtained melting at 175–180° C. This material was acetylated with the production of crude p-acetylamino benzoic acid melting at 240–250° C.

*Example 8* p-Nitrosalicylic acid was reduced in accordance with the previously described procedures with the production of p-aminosalicylic acid.

While in all of the above examples, reactions employing a palladium catalyst have been described, equally good results are obtained with a platinum catalyst, for example, a catalyst prepared by reducing platinum oxide with hydrogen at two atmospheres pressure. In the absence of palladium or platinum, no reduction occurs in any of the above examples.

While aldehydes such as formaldehyde and benzaldehyde are reduced by hydrogen in the presence of a platinum catalyst, aldehydes are not reduced by hydrazine in the presence of platinum or palladium. This provides a method for the selective reduction of aldehydes containing a substituent susceptible of reduction by the hydrazine-palladium (or platinum) system in which the aldehyde group is not affected. Thus, p-nitrobenzaldehyde may be reduced by this method to p-aminobenzaldehyde which in turn may be converted to p-acetylamino benzaldehyde. The last named compound reacts with thiosemicarbazide to give the thiosemicarbazone of p-acetylamino benzaldehyde Tb I/698 (Schmidt), a compound that shows considerable promise in the treatment of tuberculosis). In reductions of this type, it is believed that a part of the hydrazine present reacts with the aldehyde group to form a hydrazone, thereby preventing reduction of this group. In the reduction of substituted aldehydes (or ketones) an equimolecular amount of hydrazine (based on the aldehyde or ketone) is employed in addition to that required for reduction of the susceptible substituent or group in order to supply the hydrazine necessary to form the hydrazone. After reduction is complete, the reduced hydrazone is easily hydrolyzed to the reduced aldehyde (or ketone), usually with quantitative yields.

Likewise, while olefinic compounds can be hydrogenated, for example, with hydrogen in the presence of a platinum catalyst, olefines are not reduced by hydrazine-palladium (or platinum). This provides a method for the selective reduction of olefines with a substituent or group susceptible to reduction by the hydrazine-palladium (or platinum) system. Thus, 2-nitro 1-phenyl propene-1 may be converted to 2-amino 1-phenyl propene-1 (amphetamine) in this manner.

As has been mentioned previously, the hydrazine reduction of organic compounds may also be catalyzed with nickel although this catalyst is less advantageous than platinum or palladium. An example of the nickel catalyzed hydrazine reduction of nitrobenzene follows.

*Example 9*

A methanol solution of 0.1 mole hydrazine was added at room temperature to an alcoholic solution of 0.05 mole of nitrobenzene containing Raney nickel in suspension. On working up the resulting reaction mixture, aniline was obtained in 90% yield.

Nickel decomposes hydrazine to a gas containing hydrogen, nitrogen and a little ammonia. Platinum or palladium catalysts, on the other hand, do not decompose hydrazine. (However, a trace of platinum, for example, greatly accelerates the rate of hydrazine decomposition by nickel.) Accordingly, when nickel is employed as a catalyst, a portion of the reducing agent is decomposed to produce a gas having no reducing action under the reaction conditions employed. The magnitude of such a loss is indicated by the fact that a certain nickel catalyst, when added to a hydrazine solution, brought about decomposition of 50% of the hydrazine available in 6.2 minutes. Another preparation of nickel catalyst, giving rise to 50% decomposition of hydrazine in 9.0 minutes was so active when promoted by a trace of platinum that it brought about 50% decomposition of the hydrazine available in only 2.5 minutes.

Also, the hydrazine-nickel system is less selective in its action than hydrazine-palladium (or platinum). Thus, while hydrazine-palladium (or platinum) does not reduce olefines, hydrazine-nickel does so as the following example shows.

*Example 10*

An alcoholic solution containing 0.1 mole of hydrazine was added at room temperature to an alcoholic solution of 0.2 mole of styrene and containing nickel catalyst in suspension. On working up the reaction mixture, a 90% yield of ethyl benzene was obtained. Similar experiments, in which palladium and platinum were respectively substituted for the nickel catalyst, produced no reaction of any kind.

While it is evident that nickel catalyzes the hydrazine reduction of organic compounds at room temperature, this catalyst also brings about the decomposition of the reducing agent to useless products (not observed with palladium or platinum) and also results in a less selective reduction system than when platinum (or palladium) is employed as catalyst. For these reasons, while nickel is an operative catalyst, it is less advantageous than platinum or palladium catalysts.

While the above examples are exclusively concerned with the use of hydrazine as a reducing agent, substituted hydrazines may be employed if desired. Thus, methyl hydrazine behaves in a manner similar to that exhibited by hydrazine except that the evolved gas contains methane and some ethane, this last being formed presumably by the union of free methyl radicals produced during the reduction reaction. Obviously substituted hydrazines are less efficient than hydrazine itself, even on an equimolecular basis, since the substituent replaces a portion of the available reducing hydrogen of hydrazine and, in addition, abstracts more hydrogen during the reduction reaction to form, e. g. methane.

Be it remembered, that while my invention has been described by means of numerous examples thereof, these are illustrative and non-limiting and it is to be understood that my invention covers all changes and modifications of the examples thereof, herein chosen for purposes of disclosure, that do not constitute departures from the spirit and scope of my invention.

I claim:

A method for the selective reduction of 2-nitro 1-phenyl propene-1 to 2-amino 1-phenyl propene-1 by interacting said 2-nitro 1-phenyl propene-1 with hydrazine in the presence of a catalyst consisting of a finely divided metal selected from the group consisting of palladium and platinum.

References Cited in the file of this patent

UNITED STATES PATENTS 2,329,934  Nord _____ Sept. 21, 1943

OTHER REFERENCES

Kuhn: Jour. Am. Chem. Soc., vol. 73, pp. 1510–12, June 1950.

Audrieth and Ogg: The Chem. of Hydrazine, p. 136, Apr. 1949.

Busch and Schulz: Berichte per Deutschen Chemischen Gesellschaft, vol. 62, pp. 1458–66, Apr. 10, 1929.

Gilbert: JACS, vol. 51 (1929), pp. 2744–51.